(12) United States Patent
Lisboa

(10) Patent No.: US 9,772,635 B2
(45) Date of Patent: Sep. 26, 2017

(54) INTEGRATION SYSTEM AND METHOD FOR REGULATING AND OPERATING IN PARALLEL DIFFERENT HIGH-VOLTAGE SOURCES

(75) Inventor: Luciano Antonio Calmon Lisboa, Recife (BR)

(73) Assignee: Companhia Hidro Eléctrica do São Francisco—CHESF, Recife (BR)

( * ) Notice: Subject to any disclaimer, the term of this patent is extended or adjusted under 35 U.S.C. 154(b) by 706 days.

(21) Appl. No.: 14/352,101

(22) PCT Filed: Aug. 15, 2012

(86) PCT No.: PCT/BR2012/000390
§ 371 (c)(1),
(2), (4) Date: May 15, 2014

(87) PCT Pub. No.: WO2013/056325
PCT Pub. Date: Apr. 25, 2013

(65) Prior Publication Data
US 2014/0303803 A1 Oct. 9, 2014

(30) Foreign Application Priority Data
Oct. 17, 2011 (BR) .................................... 1106471

(51) Int. Cl.
*G05F 1/10* (2006.01)
*H02J 3/04* (2006.01)
*H02J 3/38* (2006.01)

(52) U.S. Cl.
CPC ................. *G05F 1/10* (2013.01); *H02J 3/04* (2013.01); *H02J 3/38* (2013.01)

(58) Field of Classification Search
CPC ................. G05F 1/10; H02J 3/04; H02J 3/38
See application file for complete search history.

(56) References Cited

U.S. PATENT DOCUMENTS

| | | | | |
|---|---|---|---|---|
| 5,498,954 A * | 3/1996 | Bassett | ...................... | G05F 1/14 323/255 |
| 5,517,423 A | 5/1996 | Pomatto | | |
| 6,100,674 A * | 8/2000 | Dohnal | ................. | H01H 9/0005 323/256 |
| 2002/0017615 A1 | 2/2002 | Ando | | |
| 2004/0267483 A1* | 12/2004 | Percer | ................. | G01R 31/3173 702/118 |
| 2007/0025217 A1 | 2/2007 | Miyaoka | | |
| 2007/0057652 A1* | 3/2007 | Hoffman | .................. | G05F 1/147 323/258 |
| 2009/0147554 A1 | 6/2009 | Adest | | |
| 2010/0001700 A1* | 1/2010 | Santos | ...................... | G05F 1/14 323/256 |

(Continued)

OTHER PUBLICATIONS

PCT/WIPO, International Search Report (on priority application), Feb. 27, 2013.

(Continued)

*Primary Examiner* — Charles E Anya
(74) *Attorney, Agent, or Firm* — Laurence P. Colton; Smith Tempel Blaha LLC

(57) ABSTRACT

The present invention provides systems and methods for integration and for the regulation and parallelism among different models of voltage sources and/or high voltage energized gaps. In a preferred embodiment, the present invention provides an efficient and inexpensive way to integrate equipment such as transformers, in any amounts, with different voltages and different specifications in the same parallelism logic, meeting strict criteria and requirements.

34 Claims, 1 Drawing Sheet

(56) References Cited

U.S. PATENT DOCUMENTS

| | | | |
|---|---|---|---|
| 2010/0057265 A1 | 3/2010 | Szemkus | |
| 2010/0100345 A1* | 4/2010 | Katrak | G01R 19/2509 702/65 |
| 2011/0016321 A1 | 1/2011 | Sundaram | |
| 2011/0049992 A1 | 3/2011 | Sant'Anselmo | |
| 2011/0074367 A1* | 3/2011 | Yoon | H02J 3/1842 323/210 |
| 2012/0061964 A1* | 3/2012 | Kirchner | F03D 7/0284 290/44 |
| 2012/0092894 A1* | 4/2012 | Navarro | H02J 3/1878 363/13 |
| 2012/0200279 A1* | 8/2012 | Pamulaparthy | H02J 3/1807 323/301 |
| 2012/0249278 A1* | 10/2012 | Krok | H02P 13/06 336/150 |
| 2013/0063272 A1* | 3/2013 | Bhageria | H02J 13/001 340/650 |
| 2014/0248802 A1* | 9/2014 | Hieda | H04L 12/2818 439/620.01 |
| 2015/0222194 A1* | 8/2015 | Bundschuh | H02J 3/00 307/31 |
| 2016/0254106 A1* | 9/2016 | Jang | H02J 3/12 |

OTHER PUBLICATIONS

IEEE, "The Unified Power Controller: A New Approach to Power Transmission Control", IEEE Transactions on Power Delivery, vol. 10, No. 2 (Apr. 1995).

* cited by examiner

INTEGRATION SYSTEM AND METHOD FOR REGULATING AND OPERATING IN PARALLEL DIFFERENT HIGH-VOLTAGE SOURCES

FIELD OF THE INVENTION

The present invention relates to the field of Electrical Engineering. More specifically, the present invention provides systems and methods for integration and for the regulation and parallelism among different models of voltage sources and/or high voltage energized gaps. In a preferred embodiment, the present invention provides an efficient and inexpensive way to integrate equipment such as transformers with different voltages and different specifications in the same parallelism logic, meeting strict criteria and requirements.

BACKGROUND OF THE INVENTION

Power equipment are widely used for the transformation of voltages and currents with high power values in substations (SEs), such as, for example, transformers. One difficulty currently found relates to the integration of digital systems with existing technologies for supervision of the electrical system in a logical basis which facilitates efficiency and agility of the operation. One such example are transformers with tap equivalence, often of different models, manufacturers and powers, among other features in a substation. In addition, there are often difficulties in obtaining conclusive information about the regulatory and parallelism system deployed in a pre-existing substation. There is also difficulty in finding economically viable solutions that meet strict criteria and are of high reliability and efficiency as set forth by the National Electrical System Operator (ONS).

Systems prior to the present invention did not have satisfactory digital control technologies, because existing solutions do not solve the problem of the substations having integration among voltage sources and/or energized gaps using dedicated electrical equipment with wires for voltage regulation and parallelism thereof. In addition, previous systems: (a) do not meet the strict criteria of reliability, safety and performance; (b) do not meet all the requirements established by ONS network procedures; (c) do not meet the necessary operational features, including automatic changes of voltage reference values; (d) are not applicable for any quantities and types of high voltage sources and/or energized gaps, such as transformers, and for any amounts of voltage levels; (e) are not equipment and/or manufacturer independent; (f) are not inexpensive.

Treetech® offers products applied to voltage regulation line such as physical devices provided with readings and commands as a function of load curves. These devices do not interact with other devices of different manufacturers and models in a satisfactory manner, in particular, in large quantity and also do not efficiently integrate with existing alarms and supervision.

The present invention, on the contrary, provides a solution for automation projects for the regulation and parallelism among different models of voltage sources and/or high voltage energized gaps which: (a) does meet the strict criteria of reliability, safety and performance; (b) does meet all the requirements established by ONS network procedures; (c) does meet the necessary operational features, including automatic changes of voltage reference values; (d) is applicable for any quantities and types of high voltage sources and/or energized gaps, such as transformers and/or autotransformer banks, and for any amounts of voltage levels; (e) is equipment and/or manufacturer independent; (f) is inexpensive.

The invention solves the problem of integration to obtain conclusive information about the regulation and parallelism system deployed in a pre-existing substation among the different devices and interfaces. For example, preferred embodiments of the invention are applicable in 230/69 kilovolt (kV) and 230/138 kV power substations, for which positive results have already been demonstrated, also being applicable to other types of substations/high voltage sources.

In the patent literature, some partially relevant documents were located, which will be described as follows.

Document U.S. Pat. No. 5,498,954 shows a method for controlling at least two high voltage regulators, each regulator having a tap switch, comprising operation in parallel, determining output voltage and reactive power of each regulator and determining the tap position for each regulator. The present invention differs from said document, apart from other technical reasons, in that it provides a computer implementable method and has master-slave architecture. In addition, the method of said document has functional requirements not present in the present invention: it makes MVAR flow measurement at the bottom of a transformer, requires average voltage measurements at the bottom through a programmable logic controller (PLC); it requires the PLC to calculate a voltage as a function of reactive power for each transformer with the goal of avoiding certain differences among transformers.

Document U.S. Pat. No. 5,210,443 shows a process for parallel control in selected switched combinations of tap switches of a plurality of transformers in parallel comprising the detection of the transformer tap settings, output voltage and current measurement and processing, and regulation of such transformers as a function of such variables. The present invention differs from said document, apart from other technical reasons, in that it provides a computer implementable method and has master-slave architecture, which were not cited in said document. In addition, the method of said document has functional requirements not present in the present invention: there is a need for measurement of current amplitude values and current phase angles; the need for calculation of partial load current and circulating reactive current for transmission to the voltage regulators; the need for calculation of variables in individual voltage regulators in order to determine new setpoints for individual voltage regulators.

From what can be understood from the searched literature, we found no documents anticipating or suggesting the teachings of the present invention, so that the solution proposed herein, to the eyes of the inventors, has novelty and inventive step in view of the prior art.

SUMMARY OF THE INVENTION

The present invention provides systems and methods for integration and for the regulation and parallelism among different models of voltage sources and/or high voltage energized gaps.

It is one of the objects of the present invention a system and method of integration for regulation and parallelism among different high voltage sources and/or energized gaps which comprises the steps of:

a) identifying the control variables of different high voltage sources and/or energized gaps for operation in parallel;

b) composing a complex model to automate the regulation and the parallelism among different high voltage sources and/or energized gaps (causal relationships of the automation and parallelism components); and c) converting said models in an application to automate the regulation and the parallelism among different high voltage sources and/or energized gaps.

In a preferred embodiment, the system and method of integration for regulation and parallelism among different high voltage sources and/or energized gaps use as complex model for automating an algorithm comprising the comparison between the voltage value measured in one of the high voltage sources and a reference value; if the measured voltage value is different from the reference value up to a threshold value determined by the user and for a specific time, a command is activated to restore the voltage value to the reference value.

It is another object of the invention a system and method of regulation and parallelism among different models of high voltage sources and/or energized gaps that meet strict criteria of reliability, safety and performance. In one aspect, such method and system meet all requirements established by ONS network procedures. In another aspect, said system and method are applicable to any quantities and types of high voltage sources and/or energized gaps and any amounts of voltage levels. In another aspect, said system and method meet the operational features required for a power substation, including automatic changes of voltage reference values. In another aspect, such system and method are independent of the type of product and/or manufacturer. In another aspect, such system and method are inexpensive and easy to implement.

In a preferred embodiment, the system and method of regulation and parallelism among high voltage sources and/or energized gaps comprises the steps of:

a) checking the voltage of at least one voltage source and/or energized gap from the measurement of the voltage thereof;

b) comparing the voltage measured in the previous step with a reference value acceptable for the equivalence of regulation and parallelism; and c) issuing an automated command to provide/re-establish equivalence of regulation and parallelism of the programmed voltage.

In a preferred embodiment, said steps of comparison and issuing of command are made with the use of an algorithm comprising the comparison between the voltage value measured in one of the high voltage sources and a reference value; if the measured voltage value is between 0.5-5% different in relation to the reference value for a specified amount of time, a command is engaged to restore the reference voltage value. Thus, the activation of the command step is defined to provide/re-establish equivalence of regulation and parallelism among the high voltage sources and/or energized gaps.

In more preferred embodiments, said system and method: is controlled by Supervisory Control and Data Acquisition (SCADA); monitors failures and alerts the user about them; provides a choice between manual or automatic control of each high voltage source and/or energized gap; and provides the inclusion and exclusion, by the user, of any high voltage source and/or energized gap from the parallelism logic.

In a most preferred embodiment, said system and method are applied to the regulation and parallelism among different models of power transformers and/or power autotransformer banks, and comprises the steps of:

a) determining an equivalence among taps of said transformers from the measurement of supply from the respective bar;

b) selecting master transformer and slave transformer(s) among the transformers to be regulated;

c) switching the master transformer tap in order to maintain the voltage of the supply bar within a pre-determined range; and d) switching slave transformer taps in accordance with the equivalence determined in a) in relation to the master transformer tap.

THE step of measuring the low (or high) supply bar is done in phase B. Alternatively, it can also be done in phase A or C.

In a most preferred embodiment, the step of switching is controlled by an algorithm comprising the comparison between the voltage value measured on the bar and a reference value; if the value of the voltage measured on the bar differs up to a threshold value determined by the user and for a certain amount of time, a command is engaged to adjust the tap by increasing or decreasing it. Thus, the activation of the command step is defined to provide/re-establish equivalence of regulation and parallelism of power transformers. In a more preferred embodiment, the threshold value determined by the user for the voltage difference between the measured and the reference value is 0.5-5%, more preferably 1-3%.

These and other objects of the invention will be immediately valued by persons skilled in the art and by companies having interests in the segment, and will be described in sufficient detail for their reproduction in the following description.

DETAILED DESCRIPTION OF THE INVENTION

The present invention provides systems and methods for integration and for the regulation and parallelism among different models of voltage sources and/or high voltage energized gaps. The inventive concept common to the various objects of the invention is a logic that provides the automatic control/adjustment of integration and/or regulation and parallelism among different high voltage sources and/or energized gaps, meeting strict criteria of reliability, safety and performance, in addition to all requirements established by ONS network procedures. The invention provides, in addition to other things, the following technical advantages/effects: it is applicable to any amounts and types of high voltage sources and/or energized gaps and any amounts of voltage levels; it meets the operational features required for a power substation, including automatic changes of voltage reference values; it does not depend on the type of product and/or manufacturer; it is inexpensive and easy to implement.

The examples shown herein are intended only to illustrate one of the many ways to accomplish the invention, however, without limiting the scope thereof.

System and Method of Integration for Regulation and the Parallelism among Different High Voltage Sources and/or Energized Gaps The system and method of integration for regulation and the parallelism among different high voltage sources and/or energized gaps of the invention comprises the steps of:

a) identifying the control variables of different high voltage sources and/or energized gaps for operation in parallel;

b) composing a complex model to automate the regulation and the parallelism among different high voltage sources and/or energized gaps (causal relationships of the automation and parallelism components); and c) converting said models in an application to automate the regulation and the parallelism among different high voltage sources and/or energized gaps.

In a preferred embodiment, the system and method of integration for regulation and parallelism among different high voltage sources and/or energized gaps use as complex model for automating an algorithm comprising the comparison between the voltage value measured in one of the high voltage sources and a reference value; if the measured voltage value is different up to a threshold value determined by the user and for a specific time, a command is activated to restore the voltage value to the reference value.

Figure 2:
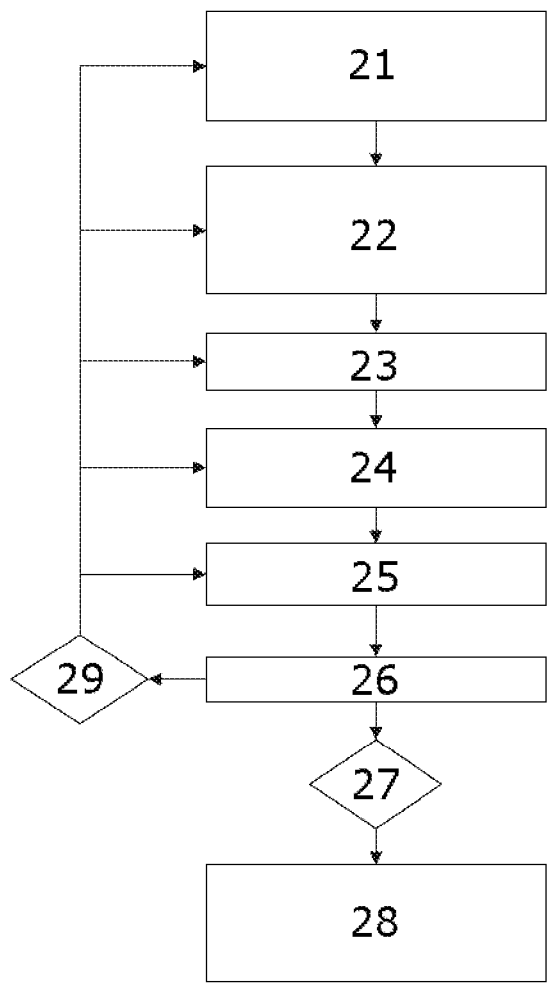
FIG. 2 shows a flowchart of the development of a preferred embodiment of the system and method of the present invention, wherein: (21) Identify the basic elements to automate the regulation and the parallelism among different high voltage sources and/or energized gaps; (22) Analyze the automation for the regulation and the parallelism among different high voltage sources and/or energized gaps (causal relationships of the automation and parallelism components); (23) Model the basic elements of regulation and the parallelism; (24) Compose complex models from basic models of regulation and the parallelism; (25) Integrate complex models in the global model; (26) Analyze the global model; (27) Right (28) Convert the global model into an application to automate the regulation and the parallelism among different high voltage sources and/or energized gaps; and (29) Wrong.

In another preferred embodiment illustrated in FIG. 2, the system and method of integration for regulation and parallelism among different high voltage sources and/or energized gaps comprises the steps of:

a) identifying the basic elements to automate the regulation and the parallelism among different high voltage sources and/or energized gaps (21) FIG. 2;

b) analyzing the automation for the regulation and the parallelism among different high voltage sources and/or energized gaps (causal relationships of the automation and parallelism components) (22) FIG. 2;

c) modeling the basic elements of regulation and parallelism (23) FIG. 2;

d) composing complex models from the basic models of the regulation and parallelism (24, FIG. 2);

e) integrating the complex models in global model (26) and analyze the global model (25, FIG. 2); and f) converting the global model into an application to automate the regulation and the parallelism among different high voltage sources and/or energized gaps (28) FIG. 2.

Figure 1:
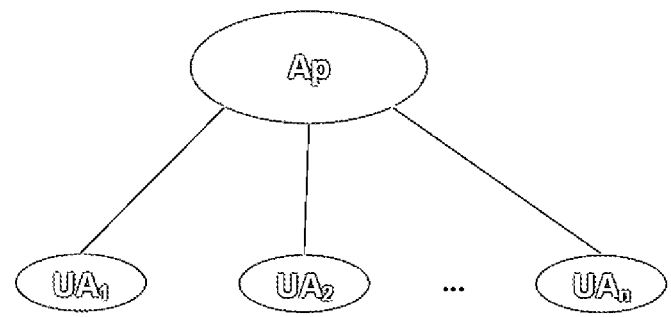
FIG. 1 shows a simplified flow diagram of a preferred embodiment of the system and method of the present invention, wherein: (Ap) Application; (UA) standalone gap unit, for example, a power transformer.

System and Method of Regulation and Parallelism among Different High Voltage Sources and/or Energized Gaps The system and method of regulation and parallelism among different models of high voltage sources and/or energized gaps of the invention are applicable to any amounts and types of high voltage sources and/or energized gaps and any amounts of voltage levels, as illustrated in FIG. 1, and meets the operational features required for a power substation, including automatic changes of voltage reference values.

In a preferred embodiment, the system and method of regulation and parallelism among different high voltage sources and/or energized gaps comprises the steps of:

a) checking the voltage of at least one voltage source and/or energized gap from the measurement of the voltage thereof;

b) comparing the voltage measured in the previous step with a reference value acceptable for the equivalence of regulation and parallelism; and c) issuing an automated command to provide/re-establish equivalence of regulation and parallelism of the programmed voltage.

In a more preferred embodiment, said step of comparison is made with the use of an algorithm comprising the comparison between the voltage value measured in one of the high voltage sources and a reference value; if the measured voltage value is between 0.5-5%, more preferably between 1-3% different in relation to the reference value for a specified amount of time, a command is engaged to restore the reference voltage value. Thus, the activation of the command step is defined to provide/re-establish equivalence of regulation and parallelism among the high voltage sources and/or energized gaps.

In more preferred embodiments, said system and method: is controlled by SCADA system; monitors failures and alerts the user about them; provides a choice between manual or automatic control of each high voltage source and/or energized gap; and provides the inclusion and exclusion, by the user, of any high voltage source and/or energized gap from the parallelism logic.

SCADA Systems

SCADA Systems are systems that monitor and trigger variables and subsystem devices of measurement, protection, command, control, supervision and regulation (MP-CCSR), being implemented by software. These systems can take topologies such as mono-post, client-server or multiple servers-clients, not limited to these. Usually, a SCADA system comprises human-machine interface, a computing subsystem, remote terminal units and/or digital control units and/or digital protective relays and/or digital oscillography units and/or programmable logic controllers, and structure for communication among the components.

System and Method of Regulation and Parallelism Applied to Transformers

In a most preferred embodiment, said system and method are applied to the regulation and parallelism among different models of power transformers, and comprises the steps of:

a) determining an equivalence among taps of said transformers and/or transformer banks from the measurement of supply from the respective bar;

b) selecting master transformer or transformer bank and slave transformer(s) and/or transformer bank(s) among the transformers to be regulated;

c) switching the master transformer or transformer bank tap in order to maintain the voltage of the supply bar within a pre-determined range; and d) switching slave transformer and/or transformer bank taps in accordance with the equivalence determined in a) in relation to the master transformer or transformer bank tap.

THE step of measuring the low (or high) supply bar is done in Phase B. Alternatively, it can also be done in phase A or C.

The steps of measuring and switching are computed by an algorithm comprising the comparison between the voltage value measured on the bar and a reference value; if the voltage value measured on the bar is greater than the reference value up to a certain limit for a specific period of time, a command is triggered to increase the tap; if the voltage value measured on the bar is less than the reference value up to a given threshold for a specified period of time, a command is triggered to lower the tap. Preferred reference values are of 0.5-5%, more preferably 1-3%. Thus, the activation of the command step is defined to provide/re-establish equivalence of regulation and parallelism of power transformers and/or transformer banks.

Said system and method provides the integration of different models of transformers and/or transformer banks, where previously there were difficulties in obtaining conclusive information about the regulation and parallelism system deployed in the substation. The consideration of such information, in addition to being useful for the prevention of problems, is essential for the efficient control of the electric power system, thus avoiding the loss of loads for some conditions of this system. In addition, because it is automated, it reduces human errors that may occur during operation. Other features/benefits: monitors failures and warns the user about them; provides a choice between manual or automatic control of each transformer and/or transformer bank; provides the inclusion and exclusion, by the user, of any transformer and/or transformer bank from the parallelism logic.

EXAMPLES

Example 1

Regulation and Parallelism of Three Phase Power Transformers

In a preferred embodiment, the invention solves a problematic situation in transformers with the following characteristics:
 i) integration of a 230/69 kV power transformer 04T3 of a substation;
 ii) power transformer 04T3 has tap equivalence different from power transformers 04T1 and 04T2 of said substation;
 iii) difficulties in obtaining conclusive information about the regulation and parallelism system deployed in said substation; and
 iv) lack of engineering solution to make the regulation and parallelism of power transformers 04T1, 04T2 and 04T3 of this substation.
Solution Employed
The formulation to solve the problem was accomplished through studies of:
 i) tap equivalence table of 230/69 kV power transformers 04T1, 04T2 and 04T3 of said substation;
 ii) instruction of load levels of the substation;
 iii) philosophy of regulation and parallelism of power transformers of a power plant.

In this preferred implementation of the invention, a functional technical specification (ET) was prepared using expert system techniques for an application that performs the regulation and the parallelism of power transformers. In FIG. 2, a flow diagram of the methodology used for application development can be observed. This ET has enabled coding in an application according to the present invention, for regulation and parallelism of power transformers in the SCADA system. This application is generic, i.e. in real cases, it can be used for any amounts and types of power transformers and for any amounts of voltage levels. The only need for the application to function correctly is that the necessary points, through the Standalone Units (UAs) of MPCCSR digital subsystems associated with each power transformer, must be supervised.

Technical Specification of the Application Logic of Regulation and Parallelism of the Three Phase Power Transformers

TABLE 1

Tap equivalence in the parallelism of 230/69 kV power transformers:

| 04T1 | 04T2 | 04T3 |
|------|------|------|
| 5, 6 | 5, 6 | 1 |
| 7, 8 | 7, 8 | 2 |
| 9, 10 | 9, 10 | 3 |
| ... | ... | ... |
| 29, 30 | 29, 30 | 13 |
| 31, 32 and 33 | 31, 32 and 33 | 14 |

Note 1: Disregard 04T3 taps≥15, because there is no equivalence of this tap on 04T1 and 04T2 taps.

Note 2: When transformers 04T1 and/or 04T2 are on tap 33 and/or 04T3 is on tap 14, it should signal be "Upper Limit Actuated" and block switching to increase taps.

Note 3: When transformers 04T1 and/or 04T2 are on tap 5 and/or 04T3 is on tap 1, it should signal be "Lower Limit Actuated" and block switching to lower taps.

Master/Slave/Individual Selection:

Note 5: Variables for transformers 04T1, 04T2 and 04T3 are created to select these transformers as Master or Slave or Individual.

Note 5A: When a transformer (04T1 or 04T2 or 04T3) is set as Individual, the command of this transformer is preferably performed by manual mode.

Note 6: In this implementation, only one transformer (04T1 or 04T2 or 04T3) can be selected as Master.

Note 7: When any transformer is in the Individual position, this should be removed from the parallelism logic.

Note 8: When a transformer is set as Master, the transformers set as Slaves should follow the behavior of increasing or lowering the Master tap, respecting the tap equivalence.

Note 9: When the transformer (04T1 or 04T2 or 04T3) is set as a Master and is de-energized (for example, in maintenance), it must be set as Individual automatically and a "Master Inconsistency" alarm should be generated.

Note 10: When the transformer (04T1 or 04T2 or 04T3) is set as Slave and is de-energized (for example, for maintenance), all transformers that are Automatic must be set as Individual automatically.

Auto/Manual Selection:

Note 10A: The Automatic/Manual selection occurs per transformer.

Note 10B: The Automatic/Manual selection only occurs when the transformer is set as Master and Slave.

Note 10C: Manual Selection—disables Automatic regulation (Relay 90).

Note 10C: Automatic Selection—enables Automatic regulation (Relay 90).

Regulation (Relay 90):

Note 10D: If 04T1 and/or 04T2 and/or 04T3 is powered by bar 02B1 and is not hindered, 04T1 and/or 04T2 and/or 04T3 must be engaged, according to the voltage on bar 02B1.

Note 10E: If 04T1 and/or 04T2 and/or 04T3 is powered by bar 02B2 and is not hindered, 04T1 and/or 04T2 and/or 04T3 must be engaged, according to the voltage on bar 02B2.

Note 11: The voltage on the 69 kV bar (02BP) is read and compared to the reference level (69.8 kV<Voltage Read from Bar<71.2 kV). If the measured voltage>71.2 kV for a predefined amount of time (for example, 5 s), it sends an order to increase the tap.

Note 12: The voltage on the 69 kV bar (02BP) is read and compared to the reference level (69.8 kV<Voltage Read from Bar<71.2 kV). If the measured voltage<69.8 kV for a predefined amount of time (for example, 5 s), it sends an order to lower the tap.

Note 12A: The recommended voltage in the SE is 71 kV during the entire period of load with voltage variation up to 1.2 kV more or less.

Note 12B: The bus voltage must be maintained within the upper and lower limits and not constantly in the recommended voltage.

Note 12C: When the voltage exceeds the limit of 72.5 kV (69 kV bus), the installation operation must perform said manual mode voltage regulation.

Note 12D: The voltage ranges should be remotely changeable.

Note 13: After each command to increase or decrease tap, there must be a confirmation that the switching operation was completed successfully, i.e., after the command order to increase or decrease the tap, if after a time to be set (for example, 30 s), the switching operation is not completed successfully (for example, the information of the Master transformer of your switch in progress, after 30 s, stays actuated), it blocks the switching to increase or decrease the tap of all transformers that are set as Automatic.

Note 14: If the information for the increasing or decreasing switch of transformer 04T1 and/or 04T2 and/or 04T3 is actuated by a set time (for example, 15 s), the emergency stop must be actuated.

Note 14A: The regulation (Relay 90) can only be activated when the transformer is set as Master.

Note 14B: If one of the transformers is in automatic mode and is not hindered, if there is no equivalence of taps≤2 between transformers, this transformer should be removed from parallelism (Disabling Relay 90) and the emergency stop must be actuated.

Note 14C: If the overvoltage or undervoltage or overcurrent of a switch in one of the transformers is actuated, the transformers should be blocked—temporarily—from the parallelism (Disabling Relay 90).

Parallelism Logic:

Note 15: When there is a transformer selected as Master, the Slaves should follow the behavior (increasing or lowering) of the Master tap, respecting the tap equivalence.

Note 15A: When the transformers are operating in parallel, only the Master controls.

Note 16: When there is a joint operation of transformers (1 Master+1 Slave or 1 Master+2 Slaves), there should be a monitoring of tap equivalences, i.e. if all transformers involved in the joint operation, after a predetermined amount of time (for example, 20 s), executed the tap change operation successfully, i.e., they are observing the equivalence table. After this time, if there is tap disagreement, the joint operation must be blocked and a "Tap Disagreement" alarm generated.

Note 17: Due to the difference between equivalences (04T3 Tap 14=04T2 Tap 31 or 04T2 Tap 32 or 04T2 Tap 33=04T1 Tap 31 or 04T1 Tap 32 or 04T1 Tap 33) of taps, when 1 command to increase or decrease the 04T3 tap is performed, 2 successive command orders, respecting the physics of the process (completion of $1^{st}$ command is expected, for only then to perform the $2^{nd}$ command), should be given to transformers 04T1 and/or 04T2.

Application Safety Conditions:

Note 18: The robustness to systemic conditions must be considered (for example, communication failure). In this condition, it should be noted that the automation of the regulation and parallelism of transformers 04T1, 04T2 and 04T3 must be locked for the safety of the power system and reliability of the application.

Note 19: The robustness to operational conditions must be considered (for example, undue maneuvers). In this condition, it should be noted that the application should not allow the achievement of such maneuvers, for the safety of the power system and reliability of the application.

Example 2

Regulation and Parallelism of Single Phase Power Autotransformer Banks

In this preferred embodiment, tests were carried out with the technical specification of the application logic of regulation and parallelism of single phase autotransformer banks 05T1, 05T2 and 05T3 of an SE:

TABLE 2

| Tap equivalence in the parallelism: | | | | | | | | |
|---|---|---|---|---|---|---|---|---|
| 05T1 (Phase A) | 05T1 (Phase B) | 05T1 (Phase C) | 05T2 (Phase A) | 05T2 (Phase B) | 05T2 (Phase C) | 05T3 (Phase A) | 05T3 (Phase B) | 05T3 (Phase C) |
| 5, 6 | 5, 6 | 5, 6 | 5, 6 | 5, 6 | 5, 6 | 1 | 1 | 1 |
| 7, 8 | 7, 8 | 7, 8 | 7, 8 | 7, 8 | 7, 8 | 2 | 2 | 2 |
| 9, 10 | 9, 10 | 9, 10 | 9, 10 | 9, 10 | 9, 10 | 3 | 3 | 3 |
| ... | . | . | . | . | . | . | . | . |
| ... | . | . | . | . | . | . | . | . |
| ... | . | . | . | . | . | . | . | . |
| 29, 30 31, 32, 33 | 29, 30 31, 32, 33 | 29, 30 31, 32, 33 | 29, 30 31, 32, 33 | 29, 30 31, 32, 33 | 29, 30 31, 32, 33 | 13 14 | 13 14 | 13 14 |

Note 1: Disregard 05T3 taps≥15, because there is no equivalence of this tap on 05T1 and 05T2 taps.

Note 2: When autotransformer banks 05T1 and/or 05T2 are on tap 33 and/or 05T3 is on tap 14, it should signal be "Upper Limit Actuated" and block switching to increase taps.

Note 3: When autotransformer banks 05T1 and/or 05T2 are on tap 5 and/or 05T3 is on tap 1, it should signal be "Lower Limit Actuated" and block switching to lower taps.

Master/Slave/Individual Selection

Note 5: variables must be created for autotransformer banks 05T1, 05T2 and 05T3 that allow to select these autotransformer banks as Master or Slave or Individual.

Note 5A: When an autotransformer bank (05T1 or 05T2 or 05T3) is set as Individual, the command of this autotransformer bank is preferably performed by manual mode.

Note 6: Only one autotransformer bank (05T1 or 05T2 or 05T3) can be selected as Master.

Note 7: When any autotransformer bank is in the Individual position, this should be removed from the parallelism logic.

Note 8: When an autotransformer bank is set as Master, the autotransformer banks set as Slaves should follow the behavior of increasing or lowering the Master tap, respecting the tap equivalence.

Note 9: When an autotransformer bank (05T1 or 05T2 or 05T3) is set as a Master and is de-energized (for example, in maintenance), it must be set as Individual automatically and a "Master Inconsistency" alarm should be generated.

Note 10: When the autotransformer bank (05T1 or 05T2 or 05T3) is set as Slave and is de-energized (for example, for maintenance), all autotransformer banks that are Automatic must be set as Individual automatically.

Auto/Manual Selection:

Note 10A: The Automatic/Manual selection occurs per autotransformer bank.

Note 10B: The Automatic/Manual selection only occurs when the autotransformer bank is set as Master and Slave.

Note 10C: Manual Selection—disables Automatic regulation (Relay 90).

Note 10C: Automatic Selection—enables Automatic regulation (Relay 90).

Regulation (Relay 90):

Note 10D: If 05T1 and/or 05T2 and/or 05T3 is powered by bar 04B1 and is not hindered, 05T1 and/or 05T2 and/or 05T3 must be engaged, according to the voltage on bar 04B1.

Note 10E: If 05T1 and/or 05T2 and/or 05T3 is powered by bar 04B2 and is not hindered, 05T1 and/or 05T2 and/or 05T3 must be engaged, according to the voltage on bar 04B2.

Note 11: The voltage on the 230 kV bar (04B1, for example) is read and compared to the reference level (230.8 kV<Voltage Read from Bar<232.2 kV). If the measured voltage>232.2 kV for a predefined amount of time (for example, 5 s), it sends an order to increase the tap.

Note 12: The voltage on the 230 kV bar (04B1, for example) is read and compared to the reference level (230.8 kV<Voltage Read from Bar<232.2 kV). If the measured voltage<230.8 kV for a predefined amount of time (for example, 5 s), it sends an order to lower the tap.

Note 12A: The recommended voltage in the SE is 232 kV during the entire period of load with voltage variation up to 1.2 kV more or less.

Note 12B: The bus voltage must be maintained within the upper and lower limits and not constantly in the recommended voltage.

Note 12C: When the voltage exceeds the limit of 233.5 kV (230 kV bus), the installation operation must perform said manual mode voltage regulation.

Note 12D: The voltage ranges should be remotely changeable.

Note 13: After each command to increase or decrease tap, there must be a confirmation that the switching operation was completed successfully, i.e., after the command order to increase or decrease the tap, if after a time to be set (for example, 30 s), the switching operation is not completed successfully (for example, the information of the Master autotransformer bank, associated with one of its switches, in progress, after 30 s, stays actuated), it blocks the switching to increase or decrease the tap of all autotransformer banks that are set as Automatic.

Note 14: If any of the information for the increasing or decreasing switches of autotransformer banks 05T1 and/or 05T2 and/or 05T3 is actuated by a set time (for example, 15 s), the emergency stop must be actuated.

Note 14A: The regulation (Relay 90) can only be activated when the autotransformer bank is set as Master.

Note 14B: If one of the autotransformer banks is in automatic mode and is not hindered, if there is no equivalence of taps≤2 between autotransformer banks, this autotransformer bank should be removed from parallelism (Disabling Relay 90) and the emergency stop must be actuated. In addition, the other autotransformer banks that are in Automatic must exit Automatic mode.

Note 14C: If one of the autotransformers of a bank is in automatic mode and is not hindered, if there is no equivalence of taps 23 2 in the autotransformer bank, the autotransformer bank should be removed from parallelism (Disabling Relay 90) and the emergency stop must be actuated. In addition, the other autotransformer banks that are in Automatic must exit Automatic mode.

Note 14D: If the overvoltage or undervoltage or overcurrent of a switch in an autotransformer bank is actuated, the autotransformer banks should be blocked—temporarily—from the parallelism (Disabling Relay 90).

Parallelism Logic:

Note 15: When there is a autotransformer bank selected as Master, the Slaves should follow the behavior (increasing or lowering) of the Master tap, respecting the tap equivalence.

Note 15A: When the autotransformer banks are operating in parallel, only the Master controls.

Note 16: When there is a joint operation of autotransformer banks (1 Master+1 Slave or 1 Master+2 Slaves), there should be a monitoring of tap equivalences among banks, i.e. if all transformers involved in the joint operation, after a predetermined amount of time (for example, 20 s), executed the tap change operation successfully, i.e., they are observing the equivalence table. After this time, if there is tap disagreement, the joint operation must be blocked and a "Tap Disagreement" alarm generated.

Note 16A: When there is a joint operation of autotransformer banks (1 Master+1 Slave or 1 Master+2 Slaves), there should be a monitoring of tap equivalences in each bank, i.e. if all transformers involved in the joint operation in each bank, after a predetermined amount of time (for example, 20 s), executed the tap change operation successfully, i.e., they are observing the equivalence table. After this time, if there is tap disagreement, the joint operation must be blocked and a "Tap Disagreement" alarm generated.

Note 17: Due to the difference between equivalences (05T3 Tap 14=05T2 Tap 31 or 05T2 Tap 32 or 05T2 Tap 33=05T1 Tap 31 or 05T1 Tap 32 or 05T1 Tap 33) of taps, when 1 command to increase or decrease the 05T3 tap is performed, 2 successive command orders, respecting the physics of the process (completion of $1^{st}$ command is expected, for only then to perform the $2^{nd}$ command), should be given to autotransformer banks 05T1 and/or 05T2.

Application Safety Conditions:

Note 18: The robustness to systemic conditions must be considered (for example, communication failure). In this condition, it should be noted that the automation of the regulation and parallelism of autotransformer banks 05T1, 05T2 and 05T3 must be locked for the safety of the power system and reliability of the application.

Note 19: The robustness to operational conditions must be considered (for example, undue maneuvers). In this condition, it should be noted that the application should not allow the achievement of such maneuvers, for the safety of the power system and reliability of the application.

Example 3

Regulation and Parallelism of Single Phase Power Autotransformer Banks and Three Phase Power Transformers In this preferred embodiment, the technical specification of the application logic of regulation and parallelism was performed with two single phase autotransformer banks 04T1, and 04T2 and a three phase transformer 04T3 of an SE:

TABLE 3

| Tap equivalence in the parallelism: | | | | | | |
|---|---|---|---|---|---|---|
| 04T1 (Phase A) | 04T1 (Phase B) | 04T1 (Phase C) | 04T2 (Phase A) | 04T2 (Phase B) | 04T2 (Phase C) | 04T3 |
| 5, 6 | 5, 6 | 5, 6 | 1 | 1 | 1 | 1 |
| 7, 8 | 7, 8 | 7, 8 | 1 | 1 | 1 | 2 |
| 9, 10 | 9, 10 | 9, 10 | 3 | 3 | 3 | 3 |
| ... | . | . | . | . | . | . |
| ... | . | . | . | . | . | . |
| ... | . | . | . | . | . | . |
| 29, 30 | 29, 30 | 29, 30 | 13 | 13 | 13 | 13 |
| 31, 32, 33 | 31, 32, 33 | 31, 32, 33 | 14 | 14 | 14 | 14 |

Note 1: Disregard 04T2 taps and ≥15 04T3 taps, because there is no equivalence of these taps on 04T1 taps.

Note 2: When autotransformer banks 04T1 and/or 04T2 are on tap 33 and/or 04T3 is on tap 14, it should signal be "Upper Limit Actuated" and block switching to increase taps.

Note 3: When autotransformer banks 04T1 and/or 04T2 are on tap 5 and/or 04T3 is on tap 1, it should signal be "Lower Limit Actuated" and block switching to lower taps.

Master/Slave/Individual Selection:

Note 5: variables must be created for autotransformer banks 04T1 and 04T2 and for transformer 04T3 that allow to select these autotransformer banks and this transformer as Master or Slave or Individual.

Note 5A: When one of autotransformer banks (04T1 or 04T2) or transformer 04T3 is set as Individual, the command of this autotransformer bank or this transformer is preferably performed by manual mode.

Note 6: Only one of the autotransformer banks (04T1 or 04T2) or transformer 04T3 can be selected as Master.

Note 7: When any of the autotransformer banks or the transformer is in the Individual position, this should be removed from the parallelism logic.

Note 8: When one of autotransformer banks or the transformer is set as Master, the autotransformer bank and the transformer or the autotransformer banks set as Slaves should follow the behavior of increasing or lowering the Master tap, respecting the tap equivalence.

Note 9: When one of the autotransformer banks (04T1 or 04T2) or transformer 04T3 is set as a Master and is de-energized (for example, in maintenance), it must be set as Individual automatically and a "Master Inconsistency" alarm should be generated.

Note 10: When one of the autotransformer banks (04T1 or 04T2) or transformer 04T3 is set as Slave and is de-energized (for example, for maintenance), all autotransformer banks and/or transformer that are Automatic must be set as Individual automatically.

Auto/Manual Selection:

Note 10A: The Automatic/Manual selection occurs per autotransformer bank or per transformer.

Note 10B: The Automatic/Manual selection only occurs when one of the autotransformer banks or the transformer is set as Master and Slave.

Note 10C: Manual Selection—disables Automatic regulation (Relay 90).

Note 10C: Automatic Selection—enables Automatic regulation (Relay 90).

Regulation (Relay 90):

Note 10D: If 04T1 and/or 04T2 and/or 04T3 is powered by bar 02B1 and is not hindered, 04T1 and/or 04T2 and/or 04T3 must be engaged, according to the voltage on bar 02B1.

Note 10E: If 04T1 and/or 04T2 and/or 04T3 is powered by bar 02B2 and is not hindered, 04T1 and/or 04T2 and/or 04T3 must be engaged, according to the voltage on bar 02B2.

Note 11: The voltage on the 69 kV bar (02B1, for example) is read and compared to the reference level (69.8 kV<Voltage Read from Bar<71.2 kV). If the measured voltage>71.2 kV for a predefined amount of time (for example, 5 s), it sends an order to increase the tap.

Note 12: The voltage on the 69 kV bar (02B1, for example) is read and compared to the reference level (69.8 kV<Voltage Read from Bar<71.2 kV). If the measured voltage<69.8 kV for a predefined amount of time (for example, 5 s), it sends an order to lower the tap.

Note 12A: The recommended voltage in the SE is 71 kV during the entire period of load with voltage variation up to 1.2 kV more or less.

Note 12B: The bus voltage must be maintained within the upper and lower limits and not constantly in the recommended voltage.

Note 12C: When the voltage exceeds the limit of 72.5 kV (69 kV bus), the installation operation must perform said manual mode voltage regulation.

Note 12D: The voltage ranges should be remotely changeable.

Note 13: After each command to increase or decrease tap, there must be a confirmation that the switching operation was completed successfully, i.e., after the command order to increase or decrease the tap, if after a time to be set (for example, 30 s), the switching operation is not completed successfully (for example, the information of an autotransformer bank set as Master, associated with one of its switches, in progress, after 30 s, stays actuated), it blocks the switching to increase or decrease the tap of all autotransformer banks and transformer that are set as Automatic.

Note 14: If any of the information for the increasing or decreasing switches of one of the autotransformer banks 04T1 and/or 04T2 and/or of transformer 04T3 is actuated by a set time (for example, 15 s), the emergency stop must be actuated.

Note 14A: The regulation (Relay 90) can only be activated when one of the autotransformer banks (04T1 or 04T2) or transformer 04T3 is set as Master.

Note 14B: If one of the autotransformer banks (04T1 or 04T2) or transformer 04T3 is in automatic mode and is not hindered, if there is no equivalence of taps≤2 between autotransformer banks and transformer, this autotransformer bank or transformer should be removed from parallelism (Disabling Relay 90) and the emergency stop must be actuated. In addition, the other autotransformer bank and/or transformer that are in Automatic must exit Automatic mode.

Note 14C: If one of the autotransformers of a bank is in automatic mode and is not hindered, if there is no equivalence of taps≤2 in an autotransformer bank, the autotransformer bank should be removed from parallelism (Disabling Relay 90) and the emergency stop must be actuated. In addition, the other autotransformer bank and/or transformer that are in Automatic must exit Automatic mode.

Note 14D: If the overvoltage or undervoltage or overcurrent of a switch in an autotransformer bank or in a transformer is actuated, the autotransformer bank or the transformer should be blocked—temporarily—from the parallelism (Disabling Relay 90).

Parallelism Logic:

Note 15: When there is a autotransformer bank or transformer selected as Master, the Slaves should follow the behavior (increasing or lowering) of the Master tap, respecting the tap equivalence.

Note 15A: When the autotransformer banks and the transformer are operating in parallel, only the Master controls.

Note 16: When there is a joint operation of autotransformer banks and transformer (1 Master+1 Slave or 1 Master+2 Slaves), there should be a monitoring of tap equivalences among banks and transformer, i.e. if all transformers involved in the joint operation, after a predetermined amount of time (for example, 20 s), executed the tap change operation successfully, i.e., they are observing the equivalence table. After this time, if there is tap disagreement, the joint operation must be blocked and a "Tap Disagreement" alarm generated.

Note 16A: When there is a joint operation of autotransformer banks and transformer (1 Master+1 Slave or 1 Master+2 Slaves), there should be a monitoring of tap equivalences in each bank, i.e. if all transformers involved in the joint operation in each bank, after a predetermined amount of time (for example, 20 s), executed the tap change operation successfully, i.e., they are observing the equivalence table. After this time, if there is tap disagreement, the joint operation must be blocked and a "Tap Disagreement" alarm generated.

Note 17: Due to the difference between equivalences (04T3 Tap 14=04T2 Tap 14=04T1 Tap 31 or 04T1 Tap 32 or 04T1 Tap 33) of taps, when 1 command to increase or decrease the 04T3 or 04T2 tap is performed, 2 successive command orders, respecting the physics of the process (completion of $1^{st}$ command is expected, for only then to perform the $2^{nd}$ command), should be given to autotransformer bank 04T1.

Application Safety Conditions:

Note 18: The robustness to systemic conditions must be considered (for example, communication failure). In this condition, it should be noted that the automation of the regulation and parallelism of autotransformer banks (04T1 and 04T2) and transformer 04T3 must be locked for the safety of the power system and reliability of the application.

Note 19: The robustness to operational conditions must be considered (for example, undue maneuvers). In this condition, it should be noted that the application should not allow the achievement of such maneuvers, for the safety of the power system and reliability of the application.

According to what is reported in the present Example, the solution of the present invention proved to be an efficient alternative for the control of regulation and parallelism in the integration of transformers of different specifications to substations.

Those skilled in the art will appreciate the knowledge presented herein and will be able to reproduce the invention in the modes presented and in other variants covered by the scope of the claims attached hereto.

The invention claimed is:

1. A system and method of regulation and parallelism among high voltage sources and/or energized gaps wherein said high voltage sources and/or energized gaps comprise power transformers and/or transformer banks, and comprising the steps of:
   a) checking voltage of at least one voltage source and/or energized gap from measurement of voltage thereof;
   b) comparing the voltage measured in step a) with a reference value acceptable for the equivalence of regulation and parallelism;
   c) issuing an automated command to provide/re-establish equivalence of regulation and parallelism of programmed voltage;
   d) determining an equivalence among taps of said transformers and/or transformer banks from measurement of supply from a respective bar;
   e) selecting master transformer or transformer bank and slave transformer(s) and/or transformer bank(s) from among the transformers to be regulated;
   f) switching the master transformer or transformer bank tap in order to maintain the voltage of a supply bar within a pre-determined range; and
   g) switching the slave transformer and/or transformer bank taps in accordance with the equivalence determined in step d) in relation to the master transformer or transformer bank tap,
   wherein the tap equivalence in the parallelism of 230/69 kV power transformers is defined as:

| 04T1 | 04T2 | 04T3 |
|---|---|---|
| 5, 6 | 5, 6 | 1 |
| 7, 8 | 7, 8 | 2 |
| 9, 10 | 9, 10 | 3 |
| 11, 12 | 11, 12 | 4 |
| 13, 14 | 13, 14 | 5 |
| 15, 16 | 15, 16 | 6 |
| 17, 18 | 17, 18 | 7 |
| 19, 20 | 19, 20 | 8 |
| 21, 22 | 21, 22 | 9 |
| 23, 24 | 23, 24 | 10 |
| 25, 26 | 25, 26 | 11 |
| 27, 28 | 27, 28 | 12 |
| 29, 30 | 29, 30 | 13 |
| 31, 32, 33 | 31, 32, 33 | 14 | disregarding of ≥15 04T3 taps, as there is no equivalence of this tap on 04T1 and 04T2 taps;

when transformers 04T1 and/or 04T2 are on tap 33 and/or 04T3 is on tap 14, switching is blocked to increase taps and optionally emits a corresponding signal; and when transformers 04T1 and/or 04T2 are on tap 5 and/or 04T3 is on tap 1, switching is blocked to lower taps and optionally emits a corresponding signal.

2. The system and method according to claim 1, wherein said steps of step b) comparing the voltage measured and step c) issuing of command are made with the use of an algorithm comprising a comparison between the voltage value measured in one of the high voltage sources and a reference value, wherein if the measured voltage value is different in relation to the reference value for a specified amount of time and up to a specified threshold, a command is engaged to restore the reference voltage value.

3. The system and method according to claim 2, wherein the threshold value determined by the user for the voltage difference between the measured and the reference value is 0.5-5%.

4. The system and method according to claim 3, wherein the threshold value determined by the user for the voltage difference between the measured and the reference value is 1-3%.

5. The system and method according to claim 1, wherein the system and method are controlled via a supervisory control and data acquisition (SCADA) system and comprise at least one of the following features: monitoring of faults; alerting about said faults; choosing between manual or automatic control of each of the high voltage source and/or energized gap; and inclusion and exclusion from the logic of parallelism, by the user, of any of the high voltage source and/or energized gap.

6. The system and method according to claim 1, wherein said steps f) and g) of switching are controlled by an algorithm comprising the comparison between the voltage value measured on the bar and a reference value, wherein if the value of the voltage measured on the bar differs up to a threshold value determined by the user and for a certain amount of time, a command is engaged to adjust the tap by increasing or decreasing the tap, thus defining the activation of the command step to provide/restore the regulation and parallelism equivalence of the transformers and/or power transformer banks.

7. The system and method according to claim 6, wherein said threshold value determined by the user for the voltage difference between the measured and the reference value is 0.5-5%.

8. The system and method according to claim 7, wherein the threshold value determined by the user for the voltage difference between the measured and the reference value is 1-3%.

9. The system and method according to claim 1, wherein:
variables for transformers 04T1, 04T2, 04T3 are created to select these transformers as Master or Slave or Individual; and when a transformer 04T1 or 04T2 or 04T3 is set as Individual, the command of this transformer is performed by manual mode.

10. The system and method according to claim 1, wherein:
only one transformer 04T1 or 04T2 or 04T3 is selected as Master;

when any transformer is in the Individual position, this transformer is removed from the parallelism logic;

when a transformer is set as Master, the transformers set as Slaves follow the behavior of increasing or lowering the Master tap, respecting the tap equivalence;

when the transformer 04T1 or 04T2 or 04T3 is set as Master and is de-energized, this transformer changes to Individual automatically; and when the transformer 04T1 or 04T2 or 04T3 is set as Slave and is de-energized, all transformers that are Automatic are set as Individual automatically.

11. A system and method of regulation and parallelism among high voltage sources and/or energized gaps wherein said high voltage sources and/or energized gaps comprise power transformers and/or transformer banks, and comprising the steps of:

a) checking voltage of at least one voltage source and/or energized gap from measurement of voltage thereof;

b) comparing the voltage measured in step a) with a reference value acceptable for the equivalence of regulation and parallelism;

c) issuing an automated command to provide/re-establish equivalence of regulation and parallelism of programmed voltage;

d) determining an equivalence among taps of said transformers and/or transformer banks from measurement of supply from the respective bar;

e) selecting master transformer or transformer bank and slave transformer(s) and/or transformer bank(s) from among the transformers to be regulated;

f) switching the master transformer or transformer bank tap in order to maintain the voltage of a supply bar within a pre-determined range; and g) switching the slave transformer and/or transformer bank taps in accordance with the equivalence determined in step d) in relation to the master transformer or transformer bank tap, wherein the tap equivalence in the parallelism of 500/230 kV power transformer banks is defined as:

| 05T1 (Phase A) | 05T1 (Phase B) | 05T1 (Phase C) | 05T2 (Phase A) | 05T2 (Phase B) | 05T2 (Phase C) | 05T3 (Phase A) | 05T3 (Phase B) | 05T3 (Phase C) |
|---|---|---|---|---|---|---|---|---|
| 5, 6 | 5, 6 | 5, 6 | 5, 6 | 5, 6 | 5, 6 | 1 | 1 | 1 |
| 7, 8 | 7, 8 | 7, 8 | 7, 8 | 7, 8 | 7, 8 | 2 | 2 | 2 |
| 9, 10 | 9, 10 | 9, 10 | 9, 10 | 9, 10 | 9, 10 | 3 | 3 | 3 |
| 11, 12 | 11, 12 | 11, 12 | 11, 12 | 11, 12 | 11, 12 | 4 | 4 | 4 |
| 13, 14 | 13, 14 | 13, 14 | 13, 14 | 13, 14 | 13, 14 | 5 | 5 | 5 |
| 15, 16 | 15, 16 | 15, 16 | 15, 16 | 15, 16 | 15, 16 | 6 | 6 | 6 |
| 17, 18 | 17, 18 | 17, 18 | 17, 18 | 17, 18 | 17, 18 | 7 | 7 | 7 |
| 19, 20 | 19, 20 | 19, 20 | 19, 20 | 19, 20 | 19, 20 | 8 | 8 | 8 |
| 21, 22 | 21, 22 | 21, 22 | 21, 22 | 21, 22 | 21, 22 | 9 | 9 | 9 |
| 23, 24 | 23, 24 | 23, 24 | 23, 24 | 23, 24 | 23, 24 | 10 | 10 | 10 |
| 25, 26 | 25, 26 | 25, 26 | 25, 26 | 25, 26 | 25, 26 | 11 | 11 | 11 |
| 27, 28 | 27, 28 | 27, 28 | 27, 28 | 27, 28 | 27, 28 | 12 | 12 | 12 |

-continued

| 05T1 (Phase A) | 05T1 (Phase B) | 05T1 (Phase C) | 05T2 (Phase A) | 05T2 (Phase B) | 05T2 (Phase C) | 05T3 (Phase A) | 05T3 (Phase B) | 05T3 (Phase C) |
|---|---|---|---|---|---|---|---|---|
| 29, 30 31, 32, 33 | 29, 30 31, 32, 33 | 29, 30 31, 32, 33 | 29, 30 31, 32, 33 | 29, 30 31, 32, 33 | 29, 30 31, 32, 33 | 13 14 | 13 14 | 13 14 | disregarding of ≥15 05T3 taps, as there is no equivalence of this tap on 05T1 and 05T2 taps;

when transformer banks 05T1 and/or 05T2 are on tap 33 and/or 05T3 is on tap 14, switching is blocked to increase taps and optionally emits a corresponding signal; and when transformers 05T1 and/or 05T2 are on tap 5 and/or 05T3 is on tap 1, switching is blocked to lower taps and optionally emits a corresponding signal.

12. The system and method according to claim 11, wherein said steps of step b) comparing the voltage measured and step c) issuing of command are made with the use of an algorithm comprising a comparison between the voltage value measured in one of the high voltage sources and a reference value, wherein if the measured voltage value is different in relation to the reference value for a specified amount of time and up to a specified threshold, a command is engaged to restore the reference voltage value.

13. The system and method according to claim 12, wherein the threshold value determined by the user for the voltage difference between the measured and the reference value is 0.5-5%.

14. The system and method according to claim 13, wherein the threshold value determined by the user for the voltage difference between the measured and the reference value is 1-3%.

15. The system and method according to claim 11, wherein the system and method are controlled via a supervisory control and data acquisition (SCADA) system and comprise at least one of the following features: monitoring of faults; alerting about said faults; choosing between manual or automatic control of each of the high voltage source and/or energized gap; and inclusion and exclusion from the logic of parallelism, by the user, of any of the high voltage source and/or energized gap.

16. The system and method according to claim 11, wherein said steps f) and g) of switching are controlled by an algorithm comprising the comparison between the voltage value measured on the bar and a reference value, wherein if the value of the voltage measured on the bar differs up to a threshold value determined by the user and for a certain amount of time, a command is engaged to adjust the tap by increasing or decreasing the tap, thus defining the activation of the command step to provide/restore the regulation and parallelism equivalence of the transformers and/or power transformer banks.

17. The system and method according to claim 16, wherein said threshold value determined by the user for the voltage difference between the measured and the reference value is 0.5-5%.

18. The system and method according to claim 17, wherein the threshold value determined by the user for the voltage difference between the measured and the reference value is 1-3%.

19. The system and method according to claim 11, wherein:

variables for autotransformer banks 05T1, 05T2, and 05T3 are created to select these autotransformer banks as Master or Slave or Individual; and when an autotransformer bank 05T1, 05T2, and 05T3 is set as Individual, the command of this autotransformer bank is performed by manual mode.

20. The system and method according to claim 11, wherein:

only one autotransformer bank 05T1 or 05T2 or 05T3 is selected as Master;

when any autotransformer bank is in the Individual position, this autotransformer bank is removed from the parallelism logic;

when a transformer is set as Master, the autotransformer banks set as Slaves follow the behavior of increasing or lowering the Master tap, respecting the tap equivalence:

when the autotransformer bank 05T1 or 05T2 or 05T3 is set as a Master and is de-energized, this autotransformer bank changes to Individual automatically; and when the autotransformer bank 05T1 or 05T2 or 05T3 is set as Slave and is de-energized, all autotransformer banks that are Automatic are set as Individual automatically.

21. A system and method of regulation and parallelism among high voltage sources and/or energized gaps wherein said high voltage sources and/or energized gaps comprise power transformers and/or transformer banks, and comprising the steps of:

a) checking voltage of at least one voltage source and/or energized gap from measurement of voltage thereof;

b) comparing the voltage measured in step a) with a reference value acceptable for the equivalence of regulation and parallelism;

c) issuing an automated command to provide/re-establish equivalence of regulation and parallelism of programmed voltage;

d) determining an equivalence among taps of said transformers and/or transformer banks from measurement of supply from a respective bar;

e) selecting master transformer or transformer bank and slave transformer(s) and/or transformer bank(s) from among the transformers to be regulated;

f) switching the master transformer or transformer bank tap in order to maintain the voltage of a supply bar within a pre-determined range; and g) switching the slave transformer and/or transformer bank taps in accordance with the equivalence determined in step d) in relation to the master transformer or transformer bank tap, wherein the tap equivalence in the parallelism of 230/69 kV power transformer banks and transformers defined as:

| 04T1 (Phase A) | 04T1 (Phase B) | 04T1 (Phase C) | 04T2 (Phase A) | 04T2 (Phase B) | 04T2 (Phase C) | 04T3 |
|---|---|---|---|---|---|---|
| 5, 6 | 5, 6 | 5, 6 | 1 | 1 | 1 | 1 |
| 7, 8 | 7, 8 | 7, 8 | 1 | 1 | 1 | 2 |
| 9, 10 | 9, 10 | 9, 10 | 3 | 3 | 3 | 3 |
| 11, 12 | 11, 12 | 11, 12 | 4 | 4 | 4 | 4 |
| 13, 14 | 13, 14 | 13, 14 | 5 | 5 | 5 | 5 |
| 15, 16 | 15, 16 | 15, 16 | 6 | 6 | 6 | 6 |
| 17, 18 | 17, 18 | 17, 18 | 7 | 7 | 7 | 7 |
| 19, 20 | 19, 20 | 19, 20 | 8 | 8 | 8 | 8 |
| 21, 22 | 21, 22 | 21, 22 | 9 | 9 | 9 | 9 |
| 23, 24 | 23, 24 | 23, 24 | 10 | 10 | 10 | 10 |
| 25, 26 | 25, 26 | 25, 26 | 11 | 11 | 11 | 11 |
| 27, 28 | 27, 28 | 27, 28 | 12 | 12 | 12 | 12 |
| 29, 30 | 29, 30 | 29, 30 | 13 | 13 | 13 | 13 |
| 31, 32, 33 | 31, 32, 33 | 31, 32, 33 | 14 | 14 | 14 | 14 | disregarding of ≥15 04T3 and 04T3 taps, as there is no equivalence of this tap on 04T1 taps;

when transformer banks 04T1 and/or 04T2 are on tap 33 and/or 04T3 is on tap 14, switching is blocked to increase taps and optionally emits a corresponding signal; and when transformers 04T1 and/or 04T2 are on tap 5 and/or 04T3 is on tap 1, switching is blocked to lower taps and optionally emits a corresponding signal.

22. The system and method according to claim 21, wherein said steps of step b) comparing the voltage measured and step c) issuing of command are made with the use of an algorithm comprising a comparison between the voltage value measured in one of the high voltage sources and a reference value, wherein if the measured voltage value is different in relation to the reference value for a specified amount of time and up to a specified threshold, a command is engaged to restore the reference voltage value.

23. The system and method according to claim 22, wherein the threshold value determined by the user for the voltage difference between the measured and the reference value is 0.5-5%.

24. The system and method according to claim 23, wherein the threshold value determined by the user for the voltage difference between the measured and the reference value is 1-3%.

25. The system and method according to claim 21, wherein the system and method are controlled via a supervisory control and data acquisition (SCADA) system and comprise at least one of the following features: monitoring of faults, alerting about said faults; choosing between manual or automatic control of each of the high voltage source and/or energized gap; and inclusion and exclusion from the logic of parallelism, by the user, of any of the high voltage source and/or energized gap.

26. The system and method according to claim 21, wherein said steps f) and g) of switching are controlled by an algorithm comprising the comparison between the voltage value measured on the bar and a reference value, wherein if the value of the voltage measured on the bar differs up to a threshold value determined by the user and for a certain amount of time, a command is engaged to adjust the tap by increasing or decreasing the tap, thus defining the activation of the command step to provide/restore the regulation and parallelism equivalence of the transformers and/or power transformer banks.

27. The system and method according to claim 26, wherein said threshold value determined by the user for the voltage difference between the measured and the reference value is 0.5-5%.

28. The system and method according to claim 27, wherein the threshold value determined by the user for the voltage difference between the measured and the reference value is 1-3%.

29. The system and method according to claim 21, wherein:
variables for autotransformer banks 04T1, 04T2 and for transformer 04T3 are created to select these autotransformer banks and transformer as Master or Slave or Individual; and
when an autotransformer bank 04T1, 04T2 or transformer 04T3 is set as Individual, the command of this autotransformer bank or this transformer is performed by manual mode.

30. The system and method according to claim 21, wherein:
only one autotransformer bank 04T1 or 04T2 or a transformer 04T3 is selected as Master;
when any autotransformer bank or transformer is in the Individual position, this autotransformer bank or transformer is removed from the parallelism logic;
when an autotransformer bank or transformer is set as Master, the autotransformer bank and the transformer or the autotransformer banks set as Slaves follow the behavior of increasing or lowering the Master tap, respecting the tap equivalence;
when the autotransformer bank 04T1 or 04T2 or transformer 05T3 is set as Master and is de-energized, this autotransformer bank or transformer changes to Individual automatically; and
when the autotransformer bank 04T1 or 04T2 or the transformer 04T3 is set as Slave and is de-energized, all autotransformer banks and/or transformer that are Automatic are set as Individual automatically.

31. The system and method according to claim 30, wherein the Automatic/Manual selection occurs per transformer or transformer bank and occurs only when the transformer or transformer bank is set as Master or Slave.

32. The system and method according to claim 30, wherein:
the 69 kV bar 02B1 and/or 02B2 voltage is measured and compared with the reference level 69.8 kV<Voltage Read from Bar<71.2 kV; if the voltage read >71.2 kV for a specified period of time, tap is increased; and
the 69 kV bar 02B1 and/or 02B2 voltage is measured and compared with the reference level 69.8 kV<Voltage Read from Bar<71.2 kV; if the voltage read <69.8 kV for a specified period of time, tap is lowered.

33. The system and method according to claim 30, wherein:
the 230 kV bar 04B1 and/or 04B2 voltage is measured and compared with the reference level 230.8 kV<Voltage Read from Bar<232.2 kV; if the voltage read >232.2 kV for a specified period of time, tap is increased; and
the 230 kV bar 04B1 and/or 04B2 voltage is measured and compared with the reference level 230.8 kV<Voltage Read from Bar<232.2 kV; if the voltage read <230.8 kV for a specified period of time, tap is lowered.

34. The system and method according to claim 30, wherein voltage variation is from 0.5 to 5%, and said specified amount of time is of up to 5 seconds.

\* \* \* \* \*